Figure 1:
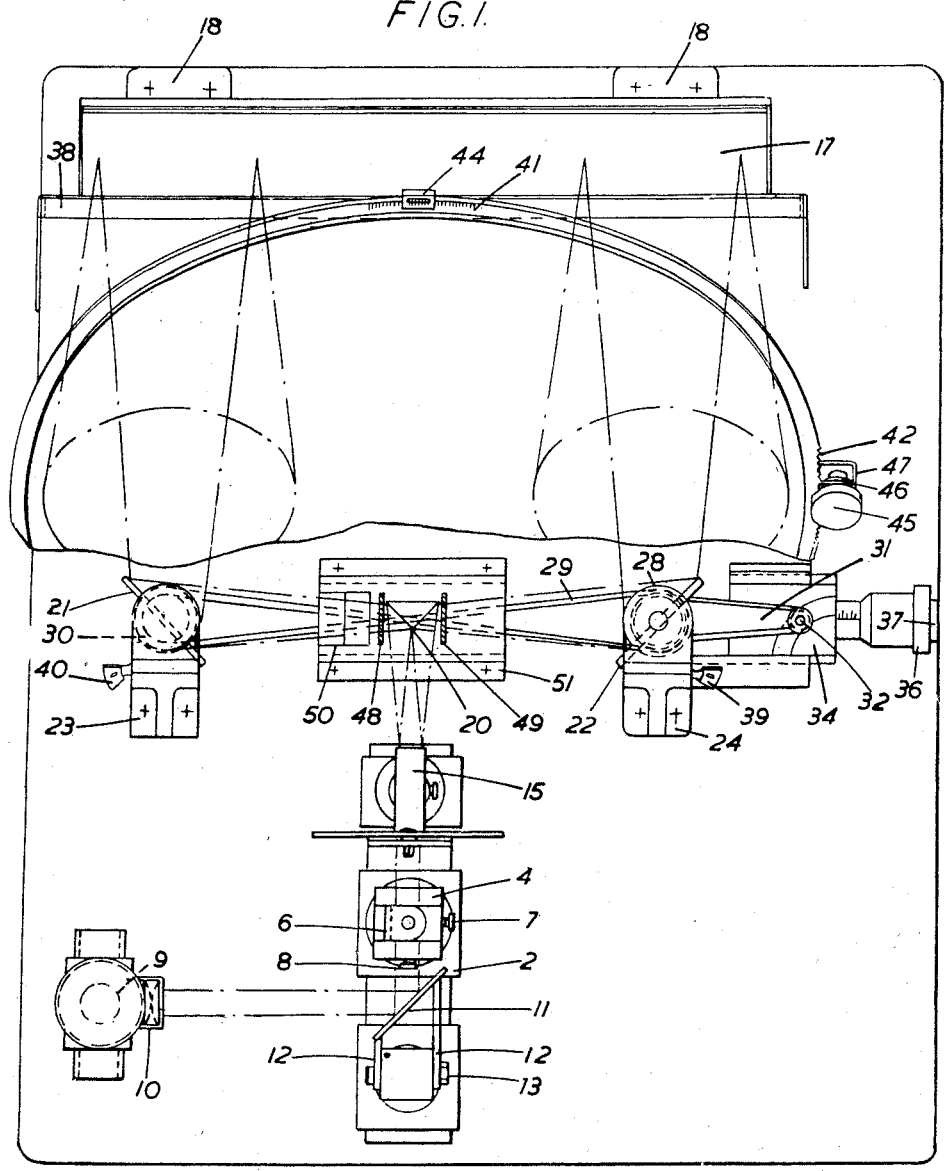

Dec. 19, 1944. M. D. WIBMER ET AL 2,365,613
OPTICAL PROJECTION APPARATUS
Filed Nov. 18, 1942 3 Sheets-Sheet 1

Inventors
M.D. Wibmer
P.P. Atkins
E.G.M. Hollinow
By James N. Curtin
Attorney

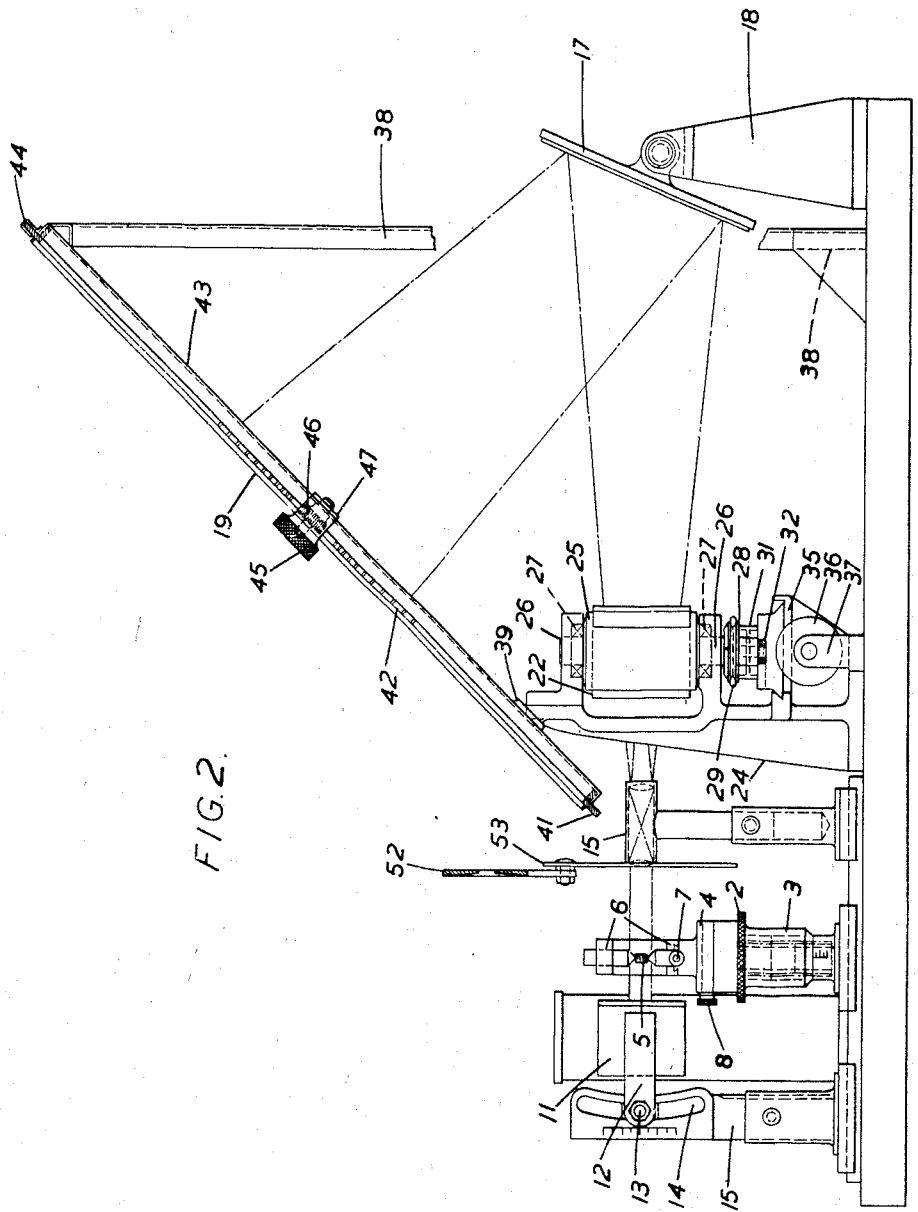

Dec. 19, 1944. M. D. WIBMER ET AL 2,365,613
OPTICAL PROJECTION APPARATUS
Filed Nov. 18, 1942    3 Sheets-Sheet 3
FIG. 4.
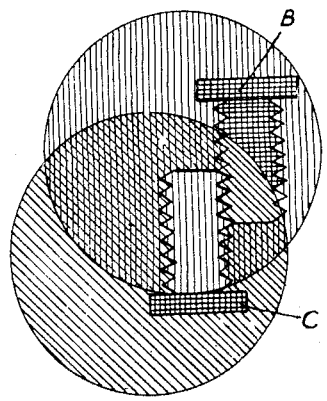
FIG. 7.
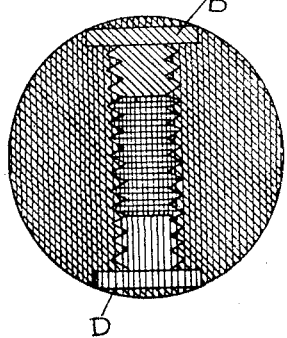
FIG. 3.
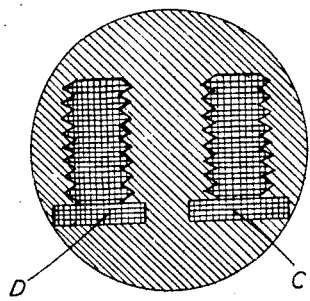
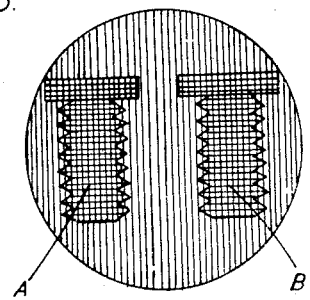
FIG. 5.
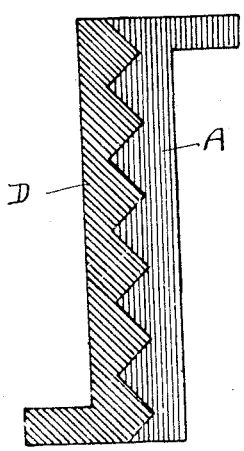
FIG. 6.
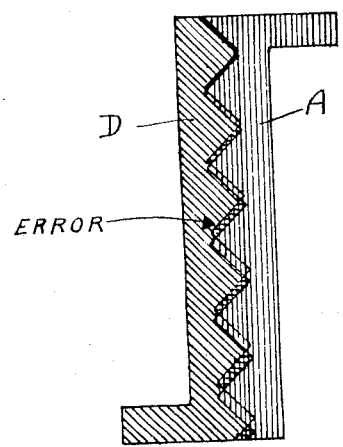
Inventors
M.D. Wibmer.
R.P. Atkins.
E.G.M. Holbrow.
By James N. Curtin
Attorney Patented Dec. 19, 1944

2,365,613

UNITED STATES PATENT OFFICE 2,365,613

OPTICAL PROJECTION APPARATUS

Martin Denzil Wibmer, Percy Parsons Atkins, and Edwin George Mander Holbrow, London, England Application November 18, 1942, Serial No. 465,986
In Great Britain November 12, 1941

12 Claims. (Cl. 88—24)

This invention relates to optical projection apparatus of the kind in which an enlarged silhouette image of an object is projected upon a screen for the purpose of inspection of the accuracy of manufacture.

Known apparatus of this kind comprises means for comparing the enlarged silhouette image with a drawing showing the required outline of the part under inspection.

According to the present invention we provide means for producing on a screen two silhouette images of an object, one inverted with respect to the other and for bringing the adjacent edges of the two images into juxtaposition, whereby the accuracy of repetitive work such as screw threads may be tested. Preferably micrometer adjusting means is provided for traversing the two images until they are completely superposed whereby measurements of parts may be made. Preferably also the beams producing the two silhouette images pass through different colour filters, e. g., red and green so that the two images can be distinguished from one another when partially superposed and the exact superposition can be determined with accuracy.

The apparatus according to the present invention preferably comprises also an apertured concave mirror movable into position to reflect light upon the side of the object towards the screen, whereby the apparatus may be used at will as an epidiascope, micrometer focus adjusting means being provided in order that measurements may be made with accuracy of the depth of depressions in an object.

The nature of the invention will be better understood from the following description of one embodiment thereof taken in conjunction with the accompanying drawings in which:

Fig. 1 is a plan view with parts broken away; and

Fig. 2 a side view of optical projection apparatus according to the invention;

Figs. 3 to 7 are diagrams of images to explain the operation of the apparatus.

Referring to the drawings, a silhouette image of an object 5, Fig. 2, is formed by a lens 15. The beam from the lens 15 is divided by means of a prism 20, Fig. 1, facing the lens 15 and having its faces aluminised. The two beams thus formed pass through different colour filters 48, 49 and are reflected by mirrors 21, 22 on or to a rear mirror 17 by means of which the beams are reflected forward on to the rear of an inclined opaque glass screen 19. One of the resulting images is reversed with respect to the other by the beam passing through a reversing prism 50. The mirrors 21, 22 are rotatable by a micrometer head 36 to bring the images on the screen 19 towards one another.

Referring now to the construction of the apparatus in more detail, the various parts are supported on a base plate 1. The object 5, here shown as a screw-threaded part is supported between centres in a cradle 6 which is adapted to be traversed parallel to the screen 19 in a slide 4 by means of a micrometer screw 7. The slide 4 is supported on a block 2 and is adapted to be traversed in the block 2 in a direction towards and away from the screen by means of a micrometer screw 8. The block 2 can be raised and lowered on a supporting pillar 2A by means of a micrometer screw 3.

A lamp 9 and collimator 10 on the left of the apparatus produce a beam of light which is reflected by mirror 11, towards the object 5. The mirror 11 is supported on arms 12 fixed to a horizontal bolt 13. The bolt 13 is clamped in an arcuate slot 14 formed in a vertical post 15 supported on base plate 1. The slot 14 is a circular arc having the central point of the lens 15 as centre of curvature. The vertical post 15 is adjustable in height above the base plate.

The lens 15 is supported in a bracket 16 fixed to the base plate 1. The prism 20, colour filters 48 and 49, and reversing prism 50 are supported on a centre pillar 51 fixed to the base plate 1 and the prism 20 is located in a frame (not shown) on the pillar 51, so that it may be removed from its frame if it is desired to use the apparatus as an epidiascope.

The rear mirror 17 is supported on a pair of brackets 18. The screen 19 is fixed in a frame 41 which fits rotatably in a ring 43 of L-cross section. The ring 43 is supported by a beam 38A, fixed to brackets 38 supported from the base plate 1, and by plates 39 on pillars 23 and 24 mounted on the base plate 1. Pillar 23 also carries the mirror 21, and pillar 24 the mirror 22.

Each of the mirrors 21 and 22 is similarly mounted to pivot about a central vertical line. The mirror 22 is rotated directly by micrometer head 36 and mirror 21 is rotated by rotation of mirror 22 by means of a spring loaded band 29 passing around pulleys 28 and 30 on the supports of the respective mirrors. Mirror 22 is secured to the flattened side of a half-round metal piece 25 formed integrally with a central pivot rod 26. The pivot rod 26 is supported vertically in pillar 24 between ball bearings 27. Its lower portion carries the pulley 28 and also an arm 31. The end of arm 31 carries a roller 32 which works in a slot 33 in a block 34. The block 34 is slidably mounted on a bed 35. The micrometer head 36 is rotatably mounted in a fixed bracket 37 and rotation of head 36 slides the block 34 on the bed 35. The roller 32 is thus moved along the slot 33 and mirror 22 is in consequence rotated. By means of pulley 28, belt 29 and pulley 30, mirror 21 is rotated through an equal angle in the opposite sense, so that the two images on the screen are moved towards or away from the centre of the screen simultaneously. The slot 33 is cut as a small portion of a sine wave so as to make the rotation of the mirrors 21 and 22 proportional to the movement of block 34 and thus to the movement of micrometer head 36. Alternatively the screen can be curved instead of flat in such manner that the dimensions thereon are proportional to linear movement of the micrometer head 36.

The frame 41 to which the screen 19 is fixed is provided with gear teeth 42 on its periphery, and these gear teeth mesh with a gear wheel 46 carried on a spindle furnished with a knob 45 and journalled in a bracket 47 supported on the ring 43. A scale is engraved on part of the front face of the frame 41 and a vernier 44 is supported in relation to this scale from the ring 43 so that the degree of rotation given to the screen 19 may be measured.

The holder for the lens 15 carries a bracket 53 on which is rotatably mounted an apertured concave mirror 52. The mirror 52 may be rotated out of the way into the position shown in Fig. 2 or may be rotated into position between the object 5 and the lens 15, so that the apparatus may be used as an epidiascope.

The apparatus may be used for a variety of purposes.

It may be used to check the form of such an object as a gear wheel, a threaded part, or the like, either by meshing the two images together, by meshing the image of an object with the image of a master part, or by direct comparison of an image with a chart. Dimensions such as the major, minor and effective diameters, the pitch and depth of thread or tooth of threaded parts may be measured with rapidity. Pitch error in a threaded part can be measured by comparison with a master. The depths of depressions in the surface of an object or the heights of bosses thereon may be measured.

Certain gear wheels may be tested for form by bringing the two images, one direct and one inverted together and meshing one with the other. In the case of a gear wheel, when the two images have been meshed together, rotation of the wheel being examined will cause the two images to rotate so that the correctness of mesh of a gear wheel with other wheels of similar form can be checked.

Some check of a screw threaded part for form can be made by comparing one image with the inverted image when the two are brought together in mesh. An object such as a screw threaded part may also be compared with a chart, one of the silhouette images being used for this purpose. For greater accuracy, however, it is advisable to check the object with a master form. To do this the master is set up alongside the object, the slide 6 in such case being provided with a double cradle to hold the master and the object in the field of view of the lens 15. The two sets of images on the screen will then appear as shown in Fig. 3. A is the image of the master, B the image of the object, C the inverted image of the master, D the inverted image of the object. The two sets of images are seen against differently coloured backgrounds, red in the case of A and B, and green in the case of C and D. The mirrors 21 and 22 are then tilted towards one another by the micrometer screw 36, and the two sets of images are brought towards one another. This is continued until either A comes into juxtaposition with D, or B in juxtaposition with C. By manipulation of micrometer screw 3 one set of images moves upwards on the screen and the other moves downwards and thus by manipulation of micrometer screws 3 and 36 two images to be compared may be brought into the position shown in Fig. 4. The two images here are assumed to be B and C, the others being omitted for the sake of clearness. Image B is now suffused with the background colour of C, viz.: green, and image C with the background colour of B, viz.: red. Part of the background appears red, part green and part a brown produced by the superposition of red on green. The two images may be exactly meshed with ease because the line common to them both appears intensely black and in contrast with the colours in the remaining portions of the field of view. The images may be traversed vertically from the positions shown in Fig. 4 until they are in juxtaposition throughout their length and the form of the object is thus directly checked with that of the master part.

It may be here noted that in obtaining an image or images of screw threaded objects, the mirror 11 should be moved, by moving the bolt 13 in the slot 14 until the reflected beam from the mirror is parallel to the helix angle. In this way a sharp image is obtained. In most cases the helix angle is sufficiently small to ensure that after adjustment the reflected beam falls on the aperture of the lens 15, but if the helix angle is great it may be necessary to adjust the height of the bracket 14 supporting the mirror 11 to ensure this.

Fig. 5 is an enlarged diagram showing two threads in perfect mesh. If there is, however, pitch error this may be measured as follows: The image of one of the threads of the object is arranged to be in mesh with the image of the master, the thread selected being on the periphery of the field. Cumulative error will be visually indicated by the image of the thread at any place selected being seen to be out of mesh. An enlarged veiw of this is shown in Fig. 6, where cumulative error is shown by the increasing areas of overlap shown black. The error at any selected place may then be measured from movement of the micrometer screw 3 needed to bring the teeth at that place in perfect mesh. By counting the number of teeth between the point where the teeth of the images of master and object originally in perfect mesh and the point where they were brought into perfect mesh by movement of micrometer 3, pitch error per tooth is readily ascertained. The micrometer 3 is preferably calibrated to show twice the movement actually given so as to measure vertical distances directly.

The diameters of threaded parts may be readily measured. For measurement purposes the master is removed and the erect and inverted images of the object itself are used. In order to measure major diameter the erect and inverted images are arranged adjacent to one another so that the crests of the threads of one image are shown as just in visual contact with the crests of the threads of the other image. The micrometer screw 36 is then adjusted until the images are completely superposed as shown in Fig. 7. The amount of movement given by the micrometer screw 36 is then the major diameter. Minor diameter is measured in a similar manner, but in this case the two images are first arranged like the images in Fig. 4, so that the crests of the threads on one image coincide with and fill the roots of the threads on the other image. The images are then traversed by means of the micrometer screw 36 until the crests of the threads of one image come into contact with the roots of the threads on the far side of the other image. The amount of movement as measured by micrometer screw 36 is the minor diameter. Effective diameter is measured by the amount of movement needed to traverse images from the position in Fig. 4 to that in Fig. 7. It is to be noted that the measured dimensions are twice the movements given by the micrometer screw, but this screw may be calibrated to read measurements directly.

To measure depth of thread, two images are brought to the position shown in Fig. 4. They are then traversed vertically the extent of a thread and then traversed horizontally to bring the crests of the threads just in contact, and the depth of thread can be read from micrometer 36.

The face angle of a tooth may be measured by rotation of the screen 19 by means of the knob 45. For this purpose a line is etched on the screen and this is adjusted to be horizontal with respect to the image or images thereon and to pass through the crest of a tooth. The screen 19 is then rotated until the line lies along the helix angle of the screw thread, the degree of rotation being read off by the scale and a frame 41 and vernier 44. Helix angle may be obtained from measurements of pitch and diameter, but a rough check may be obtained by measuring the angle at which mirror 11 should be set to give a perfect image.

To use the instrument as an epidiascope the prism 20 is removed and the mirror 52 rotated until the aperture therein coincides with the aperture of lens 15. The surface of an object is focussed on the screen and then the micrometer screw 8 moved to bring the bottom of a depression or the surface of a boss into focus. Measurements may thus be made by means of the micrometer screw 8.

The apparatus may be used to compare the image of an object with a chart placed on the screen 19. For this purpose the prism 20 may be removed, or one of the coloured images may be used.

It will be noted that by placing the lamp 9 and collimator 10 to one side and using mirror 11 to reflect a beam of light towards the screen, the position of the object is brought nearer to the user and manipulation of the various micrometer screws much facilitated. Moreover, the tilting of the mirror 11 to produce a sharp image of inclined parts is more convenient in operation than similar movement of a lamp and collimator.

It is to be noted that, although checking and measurement of a screw threaded part have been described by way of example, the apparatus may be used for checking and measurement of other forms of object.

What is claimed is:

1. In combination, means including a source of light to produce a profile of an object, a lens system forming an image of the profile and projecting the light therefrom towards a screen, light-reflecting means in the path of the light from the lens system to reflect said image in two separate light beams, each comprising said image and each reflecting it towards the screen, ray-inverting means in the path of one of said beams to produce an inverse image of the profile while the image from the other beam is erect, and means in the paths of said light beams to move said beams relative to each other to superimpose said inverse and erect images.

2. A combination according to claim 1, in which the relative movement of said light beams consists of a movement in one direction perpendicular to the extension of the profile.

3. A combination according to claim 1, in which the light-reflecting means consists of two prisms arranged symmetrically to the optical axis of the lens system, each of said prisms reflecting an image of the profile in a direction perpendicular to said axis, one prism reflecting in a direction opposite to that of the other prism.

4. A combination according to claim 1, in which the light-ray inverting means consists of an inverting prism.

5. A combination according to claim 1, in which the light-reflecting means consists of two prisms arranged symmetrically to the optical axis of the lens system, each of said prisms reflecting an image of the profile in a direction perpendicular to said axis, one prism reflecting in a direction opposite to that of the other prism, and in which the light-ray inverting means consists of an inverting prism arranged in the path of the light from one of said reflecting prisms.

6. A combination according to claim 1, in which the relative movement is produced by the movement of a mirror arranged in the path of at least one of said beams and reflecting said beam onto a screen.

7. A combination according to claim 1, comprising two prisms arranged symmetrically to the optical axis of the lens system, each of said prisms reflecting an image of the profile in a direction perpendicular to said axis, one prism reflecting in a direction opposite to that of the other prism, an inverting prism arranged in the path of the light from one reflecting prism, the light beam from said inverting prism and the light beam from the other reflecting prism each being reflected from a mirror arranged in the path of the light beams, both mirrors being symmetrical to the optical axis of the lens system.

8. A combination according to claim 1, comprising two prisms arranged symmetrically to the optical axis of the lens system, each of said prisms reflecting an image of the profile in a direction perpendicular to said axis, one prism reflecting in a direction opposite to that of the other prism, an inverting prism arranged in the path of the light from one of said reflecting prisms, the light beam from said inverting prism and the light beam from the other reflecting prism each being reflected from a mirror arranged in the path of the light beams, both mirrors being symmetrical to the optical axis of the lens system, at least one of said mirrors being rotatable about an axis perpendicular to the axis of the light beam to move the image of at least one light beam with respect to that of the other light beam.

9. A combination according to claim 1, comprising a color filter in the path of at least one of the light beams.

10. A combination according to claim 1, in which the screen is rotatably supported, comprising means for measuring the amount of rotation.

11. A combination according to claim 1, in which the relative movement is produced by the movement of a mirror arranged in the path of at least one of the light beams and reflecting said beam onto a screen, comprising means for measuring the amount of mirror movement.

12. A combination according to claim 1, comprising an object holder including means for holding a standard object and a test object, and means for adjusting the position of the standard object with respect to that of the test object.

MARTIN DENZIL WIBMER.
PERCY PARSONS ATKINS.
EDWIN GEORGE MANDER HOLBROW.